United States Patent
Laurent et al.

(10) Patent No.: US 7,993,794 B2
(45) Date of Patent: Aug. 9, 2011

(54) FUEL CELL COMPRISING AN ASSEMBLY CAPABLE OF MANAGING THE WATER GENERATED BY SAID CELL

(75) Inventors: Jean-Yves Laurent, Domene (FR); Marc Plissonnier, Eybens (FR); Denis Locatelli, Moirans (FR); Vincent Faucheux, Lans en Vercors (FR)

(73) Assignee: Commissariat à l'Energie Atomique, Paris (FR)

( * ) Notice: Subject to any disclaimer, the term of this patent is extended or adjusted under 35 U.S.C. 154(b) by 221 days.

(21) Appl. No.: 12/224,896

(22) PCT Filed: Mar. 8, 2007

(86) PCT No.: PCT/FR2007/000418
§ 371 (c)(1),
(2), (4) Date: Sep. 9, 2008

(87) PCT Pub. No.: WO2007/118945
PCT Pub. Date: Oct. 25, 2007

(65) Prior Publication Data
US 2009/0169947 A1    Jul. 2, 2009

(30) Foreign Application Priority Data
Mar. 17, 2006 (FR) .................................... 06 02407

(51) Int. Cl.
*H01M 8/10* (2006.01)

(52) U.S. Cl. ........................................ 429/492; 429/400
(58) Field of Classification Search ................ 429/12, 429/13, 34, 36, 38, 400, 492, 494
See application file for complete search history.

(56) References Cited

U.S. PATENT DOCUMENTS

| | | |
|---|---|---|
| 6,350,539 B1 | 2/2002 | Wood, III et al. |
| 2004/0137311 A1 | 7/2004 | Mathias et al. |
| 2005/0181264 A1 | 8/2005 | Gu et al. |
| 2005/0208366 A1* | 9/2005 | Rohwer et al. .................. 429/44 |
| 2006/0292434 A1* | 12/2006 | Hampden-Smith et al. .... 429/40 |

FOREIGN PATENT DOCUMENTS

| | | |
|---|---|---|
| DE | 100 48 182 A1 | 5/2001 |
| EP | 0 872 907 A1 | 10/1998 |
| JP | A 4-12462 | 1/1992 |
| JP | A 7-105957 | 4/1995 |

* cited by examiner

*Primary Examiner* — Jennifer Michener
*Assistant Examiner* — Monique Wills
(74) *Attorney, Agent, or Firm* — Oliff & Berridge, PLC

(57) ABSTRACT

Water produced in a fuel cell is managed and/or regulated by an assembly comprising at least one hydrophobic element and a hydrophilic element. The hydrophilic element is in contact with at least one first area of an outer surface of the cathode. The hydrophobic element covers the whole of a face of the hydrophilic element opposite the outer surface of the cathode and comprises at least one through opening releasing an area of said face of the hydrophilic element.

17 Claims, 3 Drawing Sheets

FUEL CELL COMPRISING AN ASSEMBLY CAPABLE OF MANAGING THE WATER GENERATED BY SAID CELL

BACKGROUND OF THE INVENTION

The invention relates to a fuel cell and more particularly a fuel microcell comprising:
a successive stacking of an anode, an electrolytic membrane and a cathode,
and an assembly arranged on at least a part of an outer surface of said cathode and comprising at least one hydrophilic element in contact with at least one first area of the outer surface of the cathode and a hydrophobic element covering the whole of a face of the hydrophilic element opposite the outer surface of the cathode.

STATE OF THE ART

In the field of fuel cells, two categories of cells exist at present, fuel cells with a filter press type stack and miniature fuel cells produced by means of techniques originating from microtechnology and more particularly by deposition and patterning of thin layers on a substrate.

For example, a basic fuel cell used in a miniature fuel cell is illustrated in FIG. 1. It comprises an electrolytic membrane 1 provided with front and rear faces 1a and 1b. Front and rear faces 1a and 1b are respectively and successively covered by first and second catalytic layers 2a and 3a and diffusion layers 2b and 3b. First catalytic layer 2a and first diffusion layer 2b form the anode 2 whereas second catalytic layer 3a and second diffusion layer 3b form the cathode 3. First and second current collectors 4 and 5 are respectively arranged on the external faces of first and second diffusion layers 2b and 3b. The EME stack and first and second current collectors 4 and 5 form a single elemental cell. They are each formed by metallic deposition comprising a plurality of transverse passages 4a and 5a designed to enable a fluid to pass through to a diffusion layer. Hydrogen, which is generally used as fuel, can thereby pass through transverse passages 4a of anodic current collector 4 to reach diffusion layer 2b of anode 2. Oxygen or air, generally acting as combustive agent, passes through transverse passages 5a of cathodic current collector 5 to reach diffusion layer 3b of cathode 3. The water produced during operation of the fuel cell is likewise removed via the same transverse passages 5a.

Cells called filter press type stack cells generally comprise a large number of elemental cells arranged in series. Each cell comprises a stack comprising an anode and a cathode separated by an electrolytic membrane. The stack, generally called EME (Electrode-Membrane-Electrode) stack, is arranged between two current collecting plates. The set of elemental cells forms an assembly of filter press type, with clamping plates bolted onto each side of a series of EME stacks. FIG. 2 thus illustrates an electrochemical cell of filter press type which comprises, as in FIG. 1, an assembly 6 formed by anode 7, electrolytic membrane 8 and cathode 9 arranged between two fluid distribution layers 10 and 11. Layers 10 and 11 are electrically conducting layers and act as ducts for the gases and liquids entering and leaving electrochemical cell from and to circulation channels 12.

With this type of fuel cell but also with fuel cells achieved by means of techniques originating from microtechnology, supply of the electrodes with reactive fluid and removal of the products formed during operation of the cell give rise to certain problems. More particularly, management of the water in the fuel cell is particularly important in that it conditions operation of the fuel cell. Excess water in a fuel cell or an electrochemical cell can in fact flood the cathode. Access of the oxygen or air to the catalytic sites of the cathode is then blocked and the cell stops working.

As represented in FIG. 2, Patent application US-A-2005/0181264 proposes using a particular cathodic current collecting plate improving management of the water produced by an electrochemical cell of filter press type. Layer 11 arranged on outer surface 9a of cathode 9 presents a certain hydrophobicity such as to push the water produced by the electrochemical cell and contained in cathode 9 towards channels 12. The hydrophobicity of layer 11 is however lower than that of cathode 9. Furthermore, the walls of channels 12 are formed by stacking of a porous hydrophilic layer 13 and a layer 14 impervious to fluids. Porous hydrophilic layer 13 attracts the water accumulated in cathode 9 by capillary forces, and impervious layer 14 forms a physical barrier between the different electrochemical cells, which together enhance removal of water to channels 12.

This solution is however not satisfactory in so far as total evacuation of the water also poses operation problems. This can in fact cause progressive drying of the electrolytic membrane, thereby reducing its ionic conductivity, which leads to the operating capacities of the cell being reduced.

In Patent application US2004/0137311, water management is controlled by diffusion supports placed in contact with the catalytic layers of the electrodes of an EME stack. The diffusion supports each comprise two superposed layers: a first layer in contact with the electrode and formed by a porous matrix and particles designed to transfer the water, and a hydrophobic second layer covering the whole of the first layer. Management of the water flow generated in the fuel cell by such diffusion supports is however not satisfactory as the hydrophobic layer arranged on the whole of the first layer presents the drawback of repelling the water to the core of the cell. When a large quantity of water is produced, the presence of the hydrophobic layer can give rise to a risk of flooding of the first layer and therefore diminish the performances of stack.

OBJECT OF THE INVENTION

The object of the invention is to provide a fuel cell remedying the shortcomings of the prior art. More particularly, the object of the invention is to produce a fuel cell provided with an assembly enabling the humidity in the fuel cell to be managed efficiently and presenting optimal performances.

According to the invention, this object is achieved by the appended claims.

More particularly, this object is achieved by the fact that the hydrophobic element comprises at least one through opening releasing an area of said face of the hydrophilic element.

BRIEF DESCRIPTION OF THE DRAWINGS

Other advantages and features will become more clearly apparent from the following description of particular embodiments of the invention given for non-restrictive example purposes only and represented in the accompanying drawings, in which.

DESCRIPTION OF PARTICULAR EMBODIMENTS

To obtain a fuel cell presenting good performances, it is preferable for the quantity of water removed in liquid form and/or evaporated not to be greater than that produced by the cathode, so that the electrolytic membrane is not dried out due to lack of water.

The quantity of water produced by the cathode does in fact depend solely on the fuel cell operating current whereas the quantity of water removed depends on the temperature in the fuel cell and on the wettability of the heat exchange surface between the stack and the outside of the fuel cell.

Figure 1:
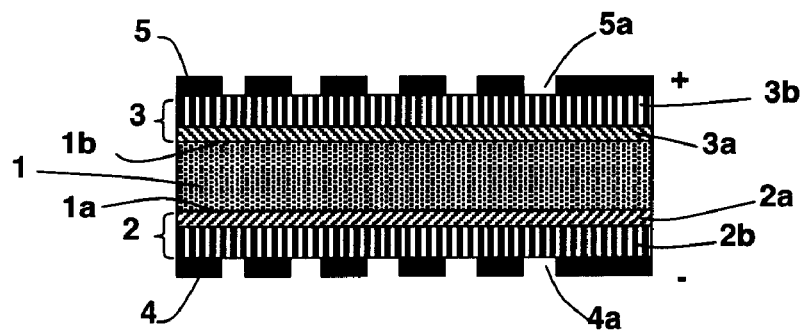
FIGS. 1 and 2 respectively illustrate first and second embodiments of an electrochemical cell of a filter press type cell according to the prior art.
Figure 2:
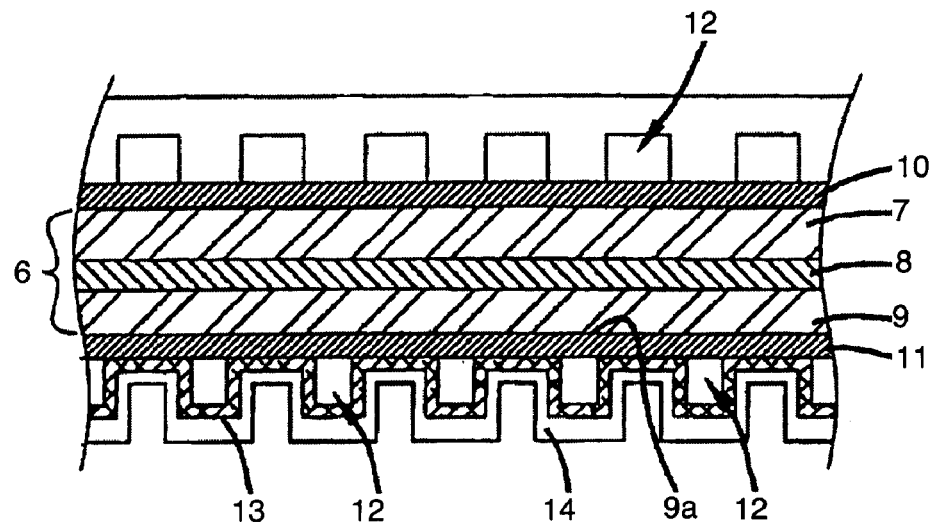
Figure 3:
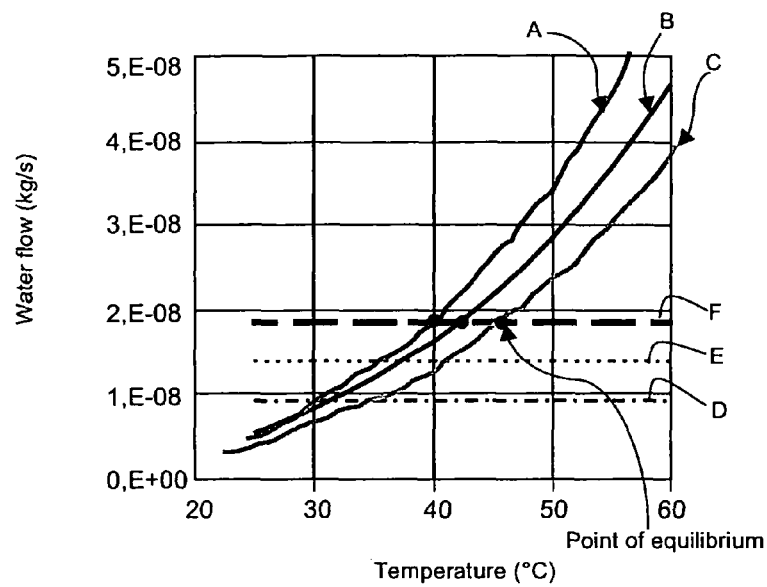
FIG. 3 represents the variation of the water flow in an electrochemical cell versus temperature for three types of heat exchange surfaces.

For illustration purposes, in FIG. 3, curves A, B and C represent the variation of the evacuated water flow in an electrochemical cell versus the temperature of the fuel cell, respectively for three type of heat exchange surfaces. The heat exchange surface corresponding to curve B is a reference heat exchange surface corresponding to the outer surface of a graphite cathode. The heat exchange surfaces corresponding respectively to curves A and C are respectively hydrophobic and hydrophilic. The hydrophobic heat exchange surface is for example obtained by covering the outer surface of a cathode with a silicon oxycarbide film whereas the hydrophilic surface is obtained by covering the outer surface of the same cathode with a silicon oxycarbide film and performing exposure with UV rays.

The point of equilibrium between the water produced and the water evacuated in the electrochemical cell was determined by plotting curves D, E and F in FIG. 3. Curves D to F in fact represent the flow variation of the water produced by the cathode, for operating currents respectively of 100 mA, 150 mA and 200 mA. It can be observed therefrom that, for a produced water flow (curve D, E or F), there are two points of equilibrium, i.e. two possible operating temperatures, depending on the environment conditions. These two points of equilibrium correspond to the intersections of curve D, E or F with curves A and C.

The humidity in the anode—electrolytic membrane—cathode stack therefore has to be managed by an assembly enabling the water produced by the cathode to be regulated in controlled manner. Therefore, according to the invention, the water produced in a fuel cell, and more particularly in a fuel microcell, is managed and/or regulated by an assembly arranged on at least one part of an outer surface of the cathode. The assembly comprises at least one hydrophobic element and a hydrophilic element, preferably each having a thickness comprised between 10 μm and 10 mm.

Figure 4:
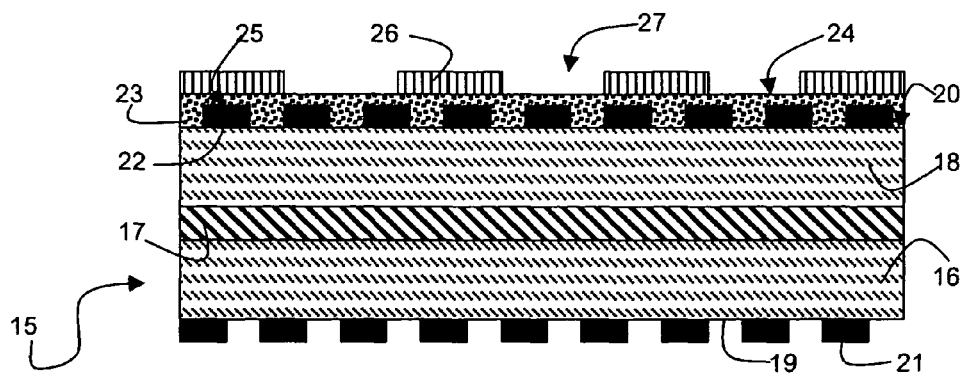
FIG. 4 represents a particular embodiment of a fuel cell according to the invention.
Figure 5:
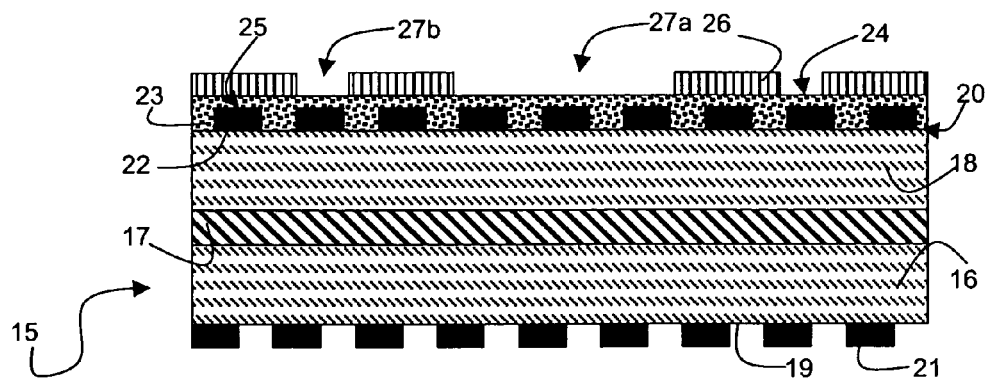
FIGS. 5 and 6 represent two variants of the embodiment represented in FIG. 4.
Figure 6:
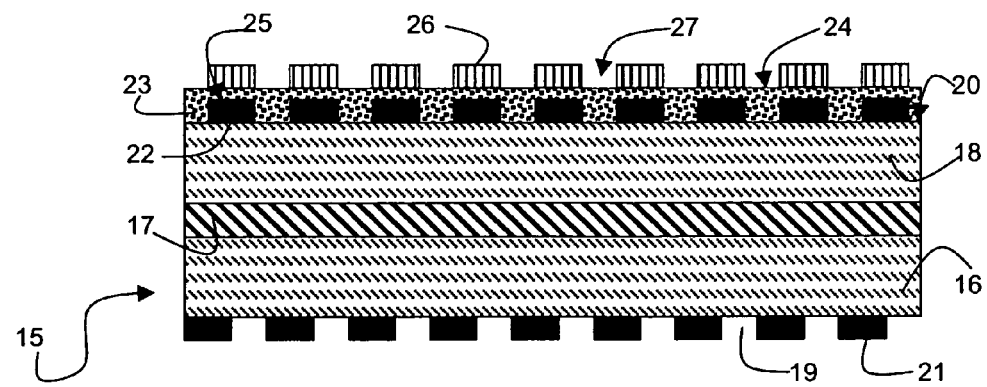

According to a particular embodiment represented in FIG. 4 and according to the alternative embodiments represented in FIGS. 5 and 6, a fuel microcell 15 comprises successive stacking of an anode 16, an electrolytic membrane 17 and a cathode 18. Anode 16 and cathode 18 respectively present outer surfaces 19 and 20 on which current collectors 21 and 22 are respectively arranged. Current collectors 21 and 22 are integrated in stack 6. They are each formed by a thin layer comprising through passages, releasing areas of said outer surfaces.

Cathodic current collector 22, provided with said through passages, is covered by a hydrophilic element preferably formed by a hydrophilic layer 23. The areas of the outer surface 20 of cathode 18 that are not covered by cathodic current collector 22 are therefore covered by hydrophilic layer 23 so as to establish a contact between said areas of outer surface 20 of cathode 18 and hydrophilic layer 23.

Hydrophilic layer 23 comprises for example a material chosen from porous graphite, a ceramic treated to obtain a hydrophilic surface and a polymer presenting a hydrophilic function, whereas the hydrophobic element can comprise a material chosen from fluorinated polymers, amorphous silicon oxycarbide and carbon nanotubes.

Hydrophilic layer 23 also comprises a preferably flat face 24 opposite the face that is in contact with outer surface 20 of cathode 18. In FIGS. 4 to 6, the thickness of hydrophilic layer 23 is greater than that of cathodic current collector 23. Cathodic current collector 22 thereby comprises a face 25 totally covered by hydrophilic layer 23. Said face 25 of cathodic current collector 22 is the face opposite the one which is in contact with cathode 18.

A hydrophobic element covers the whole of face 24 of hydrophilic element 23. It forms a physical barrier for the liquid water between the outside environment and the fuel microcell. The hydrophobic element and the hydrophilic element are on the other hand pervious to gaseous combustive agents, such as air or oxygen, so that they can access the cathode without difficulty. Furthermore, as represented in FIGS. 4 to 6, the hydrophobic element comprises at least one through opening releasing at least one area of face 24 of hydrophilic element 23. In FIGS. 4 to 6, the hydrophobic element is in the form of a hydrophobic layer 26 provided with through openings releasing areas of face 24. In FIGS. 4 and 6, through openings 27 of hydrophobic layer 26 are arranged uniformly in said layer, whereas in FIG. 5 they are arranged in non-uniform manner.

In FIG. 5, hydrophobic layer 26 in fact comprises three through openings. A first opening 27a is located substantially in the center of layer 26 and two openings 27b, less wide than the first opening 27a, are located near the edges of said layer 26.

In FIG. 6, the distribution of through openings 27 in hydrophobic layer 26 is such that through openings 27 of hydrophobic layer 26 are located above through passages of current collector 22. The passages of current collector 22 and the openings of hydrophobic layer 26 are advantageously of the same width, so that a through opening 27 extends a through passage of current collector 22. In this case, the hydrophobic areas of hydrophobic layer 26, delineated by through openings 27, are more particularly located above the areas constituting current collector 22 and delineated by through passages.

Regulation of the humidity in the cell is thereby performed by water storage in first regions of hydrophilic layer 23 whereas the water is removed by second regions of hydrophilic layer 23. The first regions of hydrophilic layer 23 are the regions of hydrophilic layer 23 covered by hydrophobic layer 26 and the second regions are those not covered by said layer. Removal of the water by the second regions of hydrophilic layer 23 is in fact performed by means of the free areas of surface 24. The presence of the through openings in hydrophobic layer 26 thereby enables localized retention of the water in the first regions of hydrophilic layer and localized removal in the second regions of said layer to be obtained. For example, in the alternative embodiment represented in FIG. 6, water storage is advantageously performed in areas where the reaction of the cell is lesser, i.e. in first regions of hydrophilic layer that are not only in contact with hydrophobic layer 26 but also with face 25 of current collector 22.

Furthermore, the quantity of water retained in the fuel cell can be managed according to the geometry of the respectively hydrophobic and hydrophilic layers. The water storage volume does in fact depend on the thickness of the hydrophilic layer whereas the quantity of water removed depends on the width of the through openings made in hydrophobic layer 26. It is then possible to find an equilibrium between the quantity of water removed by the free areas of face 24 and the quantity of water stored in the first regions of hydrophilic layer 23, so as to preserve a humidity part near the electrolytic membrane. It is also possible, in certain cases, to enhance water removal compared with water storage by increasing the width of the through openings and/or by reducing the thickness of the hydrophilic layer. This is particularly interesting when the cell presents a high operating current. The shape of through openings can moreover be of any type: round, square, etc.

The non-uniform distribution of the through openings in the hydrophobic layer presents the advantage of obtaining a different water management between the center and edge of outer surface 20 of cathode 18. This enables the differences of operation that may occur between the periphery and the center of stack 6 to be compensated. Indeed, in general manner, the temperature rise due to current collection is greater at the periphery than in the center of the stack.

The hydrophilic and hydrophobic elements can be formed either by deposition techniques originating from microelectronics or by conventional assembly techniques such as pressing. The hydrophilic element can thus be deposited on the outer surface of the cathode in the form of a thin layer preferably made from a material chosen from porous graphite, a ceramic treated to obtain a hydrophilic surface, and a polymer presenting a hydrophilic function such as for example the acid function (for example Nafion®). It can also be formed by a thin film of fabric treated to obtain a hydrophilic surface or of polymer, the film then being pressed onto outer surface 20 of cathode 18. A ceramic or a fabric can in fact be treated to have a hydrophilic surface. This treatment can for example be a plasma treatment.

In the same way, the hydrophobic element can be formed by deposition of a thin layer preferably made from a material chosen from fluorinated polymers, amorphous silicon oxycarbide and carbon nanotubes. It can also be formed by a thin film of fabric treated to obtain a hydrophobic surface, the fabric then being pressed onto the stack.

For example, in the embodiments represented in FIGS. 4 and 5, hydrophilic layer 23 can be deposited on outer surface 20 of cathode 18 by coating of an absorbent gel solution, the solution then being dried and the water evaporated. Hydrophobic layer 26 can then for example be deposited by physical vapor deposition on surface 24 of hydrophilic layer 23 through a stencil mask defining the shape of through openings 27 designed for removal of the water.

The invention claimed is:

1. A fuel cell comprising:
a membrane electrode assembly formed by a successive stacking of an anode, an electrolytic membrane and a cathode, the successive stacking being sandwiched between an anodic current collector in direct contact with the anode and a cathodic current collector in direct contact with the cathode, wherein the cathodic current collector is formed by a thin layer comprising at least one transverse passage, and
a humidity regulation element formed over the cathodic current collector, the humidity regulation element comprising:
a hydrophilic element comprising a first face and a second face, at least a part of the hydrophilic element being contained within at least one transverse passage of the cathodic current collector such that the first face of the hydrophilic element directly contacts an outer surface of the cathode, and
a hydrophobic element over the second face of the hydrophilic element,
wherein the hydrophobic element comprises at least one through opening exposing an area of the second face of the hydrophilic element, and
wherein the at least one through opening is arranged above the transverse passage of the cathodic current collector.

2. The fuel cell according to claim 1, wherein a width of the at least one through opening of the hydrophobic element is identical to a width of the transverse passage of the cathodic current collector.

3. The fuel cell according to claim 1, wherein the cathodic current collector comprises a plurality of transverse passages and wherein the hydrophobic element comprises a plurality of through openings arranged above the plurality of transverse passages of the cathodic current collector.

4. The fuel cell according to claim 3, wherein the plurality of through openings are arranged uniformly in the hydrophobic element.

5. The fuel cell according to claim 3, wherein the plurality of through openings are arranged in a non-uniform manner in the hydrophobic element.

6. The fuel cell according to claim 1, wherein the hydrophilic element comprises a material selected from the group consisting of porous graphite, a treated ceramic and a polymer having hydrophilic functionality.

7. The fuel cell according to claim 1, wherein the hydrophobic element comprises a material selected from the group consisting of fluorinated polymers, amorphous silicon oxycarbide and carbon nanotubes.

8. The fuel cell according to claim 1, wherein the hydrophilic element and the hydrophobic element each have a thickness of from 10 µm to 10 mm.

9. The fuel cell according to claim 2, wherein the cathodic current collector comprises a plurality of transverse passages and wherein the hydrophobic element comprises a plurality of through openings arranged above the plurality of transverse passages of the cathodic current collector.

10. The fuel cell according to claim 9, wherein the plurality of through openings are arranged uniformly in the hydrophobic element.

11. The fuel cell according to claim 9, wherein the plurality of through openings are arranged in a non-uniform manner in the hydrophobic element.

12. The fuel cell according to claim 1, wherein the humidity regulation element does not form a part of the cathode.

13. The fuel cell according to claim 1, wherein the humidity regulation element is formed over an outer surface of the cathodic current collector.

14. The fuel cell according to claim 1, wherein the cathode comprises a catalytic layer and a fluid diffusion layer, the outer surface of the cathode corresponding to an outer surface of the fluid diffusion layer.

15. The fuel cell according to claim 1, wherein the humidity regulation element consists of the hydrophilic element and the hydrophobic element.

16. The fuel cell according to claim 1, wherein the cathodic current collector is distinct from the humidity regulation element consisting of the hydrophilic element and the hydrophobic element.

17. A fuel cell comprising:
a membrane electrode assembly formed by a successive stacking of an anode, an electrolytic membrane and a cathode, the successive stacking being sandwiched between an anodic current collector in direct contact with the anode and a cathodic current collector in direct contact with the cathode, wherein the cathodic current collector is formed by a thin layer comprising at least one transverse passage, and a humidity regulation element formed over the cathodic current collector, the humidity regulation element comprising:
    a hydrophilic element comprising a first face and a second face, at least a part of the hydrophilic element being contained within at least one transverse passage of the cathodic current collector such that the first face of the hydrophilic element directly contacts an outer surface of the cathode, and
    a hydrophobic element over the second face of the hydrophilic element, wherein the hydrophobic element comprises at least one through opening exposing an area of the second face of the hydrophilic element, wherein the at least one through opening is arranged above the transverse passage of the cathodic current collector, and wherein an outer layer of the anodic current collector is not covered.

* * * * *